United States Patent
Lai et al.

(10) Patent No.: US 7,113,690 B2
(45) Date of Patent: Sep. 26, 2006

(54) ANTI-COUNTERFEIT METHOD AND SYSTEM BY USING A NANO METAL GRATING

(75) Inventors: Pong Lai, Tucheng (TW); Ying-Tsung Lu, Kaohsiung (TW); Ching-Chin Wu, Taichung Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 134 days.

(21) Appl. No.: 10/839,322

(22) Filed: May 4, 2004

(65) Prior Publication Data

US 2005/0141846 A1    Jun. 30, 2005

(30) Foreign Application Priority Data

Dec. 25, 2003    (TW) .............................. 92136843 A

(51) Int. Cl.
*G02B 6/00*    (2006.01)

(52) U.S. Cl. ........................................ 385/147; 385/10

(58) Field of Classification Search .................. 385/11, 385/12, 15, 33, 37, 130, 146, 147; 162/140; 235/457; 356/445

See application file for complete search history.

(56) References Cited

U.S. PATENT DOCUMENTS

| | | | |
|---|---|---|---|
| 5,811,775 A * | 9/1998 | Lee | 235/457 |
| 6,356,676 B1 * | 3/2002 | Herron et al. | 385/12 |
| 6,600,603 B1 | 7/2003 | Sambles | |
| 2003/0173046 A1 * | 9/2003 | Jaaskelainen et al. | 162/140 |
| 2005/0062973 A1 * | 3/2005 | Kim et al. | 356/445 |
| 2005/0220408 A1 * | 10/2005 | Putnam | 385/37 |
| 2005/0232530 A1 * | 10/2005 | Kekas | 385/11 |

* cited by examiner

*Primary Examiner*—Akm Enayet Ullah
(74) *Attorney, Agent, or Firm*—Townsend and Townsend and Crew LLP

(57) ABSTRACT

An anti-counterfeit method and system by using a nano metal grating, wherein an object to be recognized is formed with the nano metal grating. During the recognition process, an incidental light is applied on the metal grating. In response to the incidental light, the metal grating has its specific optical incidence and reflection characteristics. The object is then identified whether it is genuine or fake by observing the refraction light passing through and reflection light reflected from the metal grating. Further, the incident light beam can be polarized to generate polarized light beams and then irradiated on the metal grating, whereafter the recognition of the object is performed by observing the reflection and refraction lights of the irradiated polarized light beam. The recognition further can be accomplished by rotating the metal grating, thus the intensity of the refraction and reflection lights will accordingly be changed, thereby identifying the object.

11 Claims, 4 Drawing Sheets

ANTI-COUNTERFEIT METHOD AND SYSTEM BY USING A NANO METAL GRATING

BACKGROUND OF THE INVENTION

1. Field of the Invention

The present invention relates to an anti-counterfeit method and system by using a nano metal grating, and more particularly to a method and a system that can provide an anti-counterfeit protection based on the light characteristics of a nano metal grating.

2. Description of Related Art

For any profitable goods that could be illegally reproduced such as optical discs or valuable electronic devices, it is difficult to completely stop the counterfeiting behavior. With the common availability of devices, such as DVD recorders that allow reproduction from an original source, unscrupulous people can illegally reproduce copies of a very high quality for sale without payment of royalties. As well known in the art, a conventional holographic technique is widely applied in the anti-counterfeit field. For example, the holographic pigeon-pattern laser label is formed on the credit card as an identification label for verifying the authenticity of the card. However, such a laser label now is able to be successfully counterfeited.

To overcome the present anti-counterfeit problems, the present invention provides a novel method and system using a nano metal grating to effectively prevent malicious counterfeiting.

SUMMARY OF THE INVENTION

A main objective of the present invention is to provide an anti-counterfeit method and a system in which the light response of a nano metal grating is employed to inspect the genuineness of an article.

To accomplish the objective, the method comprises the acts of:

creating a nano metal grating on an object to be inspected;

providing an incident light to irradiate on the nano metal grating along an incident angle; and inspecting whether a reflection light is only observed along a reflection angle relative to the incident angle, wherein if the reflection light is only observed along the reflection angle, the object is verified as genuine, and otherwise the object is determined as a fake.

Furthermore, the anti-counterfeit system in accordance with the present invention comprises:

a platform on which an object formed with a nano metal grating is placed;

a light source, which irradiates an incident light on the nano metal grating along an incident angle; and a first light detector disposed at a position for receiving an reflection light from the nano metal grating;

wherein when the incident light irradiates on the nano metal grating, the object is able to be recognized as genuine or fake based on whether the first light detector receives the reflection light.

Other features of the invention will become apparent from the detailed description when taken in conjunction with the attached drawings.

DETAILED DESCRIPTION OF THE PREFERRED EMBODIMENT

The anti-counterfeit method of the present invention is accomplished by forming a nano metal grating onto an object and then applying an incident light to the nano grating. The response to the incident light of the nano grating thus can be employed to identify whether the object is genuine or fake.

Figure 1:
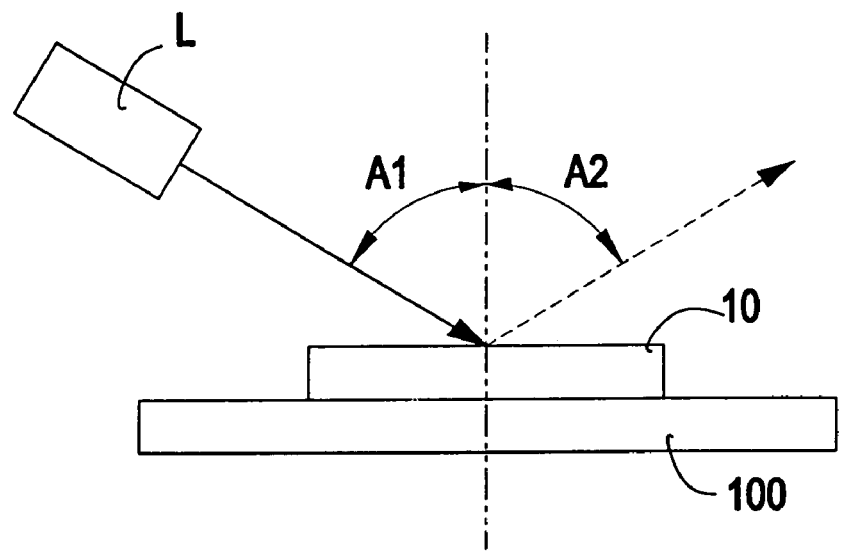
FIG. 1 is a schematic view showing the operation of a nano metal grating according to one embodiment of the present invention.

With reference to FIG. 1, a nano metal grating (10) is formed on a substrate (100) composed of opaque material. Basically, when an incident light beam L irradiates on the nano metal grating (10) along an incident angle A1, a part of the incident light beam is reflected from the nano metal grating (10) and the other part passes through the nano metal grating (10). However, since the substrate (100) is not pervious to light, it is unable to observe refraction light passing though the rear surface of the substrate (100). In this situation, the genuineness of an object formed the nano metal grating (10) thereon can be identified only by checking whether a reflection light beam is observed from the reflection angle A2. For a fake article, since there is no nano metal grating (10) formed thereon, the reflection light beam accordingly does not exist.

Figure 2:
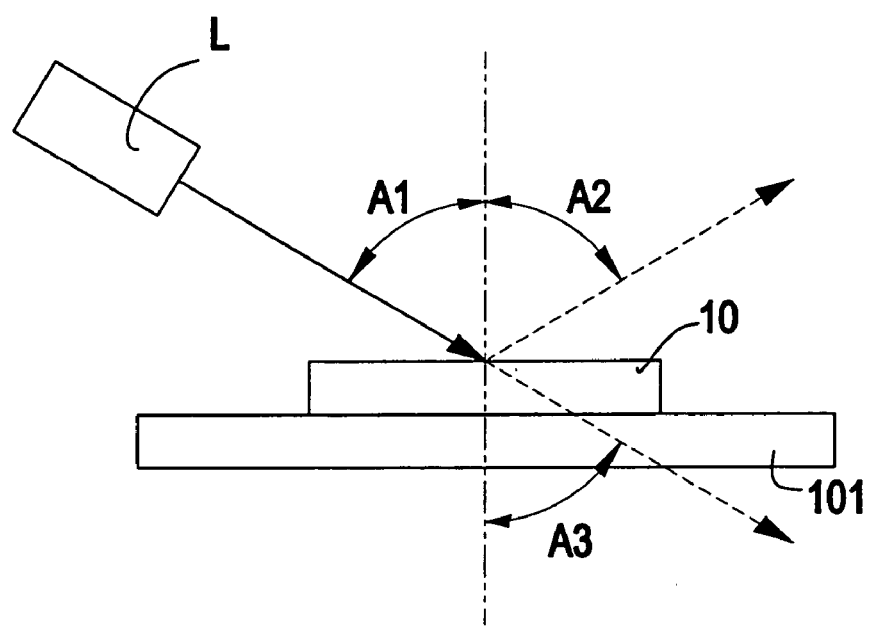
FIG. 2 is a schematic view showing the operation of a nano metal grating according to another embodiment of the present invention.

With reference to FIG. 2, the nano metal grating (10) is created on a substrate (101) that allows the light beam to pass through the nano metal grating (10). In this embodiment, both the reflection light and refraction light are able to be observed from the reflection angle A2 and the refraction angle A3. Thus, the reflection light and the refraction light can be applied to inspect whether an object is genuine.

Based on the light characteristics, the nano metal grating (10) is unable to produce diffraction light. However, the reflection and refraction lights will occur while a light beam irradiates on the nano metal grating (10). Even when rotating the nano metal grating (10) on the substrate (101 or 100), the position where the reflection light or refraction is observed still stays at the same place. However, since the nano metal grating (10) has been revolved, the intensity of the reflection light and the refraction light will accordingly change. Based on the foregoing position and intensity characteristics, an observer can determine whether the object is genuine by simultaneously checking the two conditions. If the position of the reflection and refraction lights stay at their respective same places but the intensities have changed while the nano metal grating (10) is revolved, the object checked is deemed as being genuine.

Further, a polarization process could be performed priorly on the nano metal grating (10) so that when lights of different polarization directions irradiate on the nano metal grating (10), these different polarization lights will be directly reflected from the nano metal gratin (10) or pass through the substrate (100, 101). For example, when incident light consisted of P-direction and S-direction polarization lights irradiates on the metal grating (10), the P-direction polarization light may be completely reflected from the grating (10), and the S-direction polarization light simultaneously passing through the substrate (100) becomes the refraction light. Alternatively, the S-direction polarization light may be reflected from the grating (10) while the P-direction polarization light simultaneously passes through the substrate (100).

In another aspect, light beams of different wavelengths could be used as the incident light L and then applied on the nano metal grating (10), whereby an observer can determine whether a object is fake or not based on the measured wavelength of the reflected light or the refraction light.

As mentioned above, the genuineness of an object can be inspected the naked eye through observing the response of the nano metal grating (10). Moreover, the genuineness can also be confirmed through the use of a system of the present invention.

Figure 3:
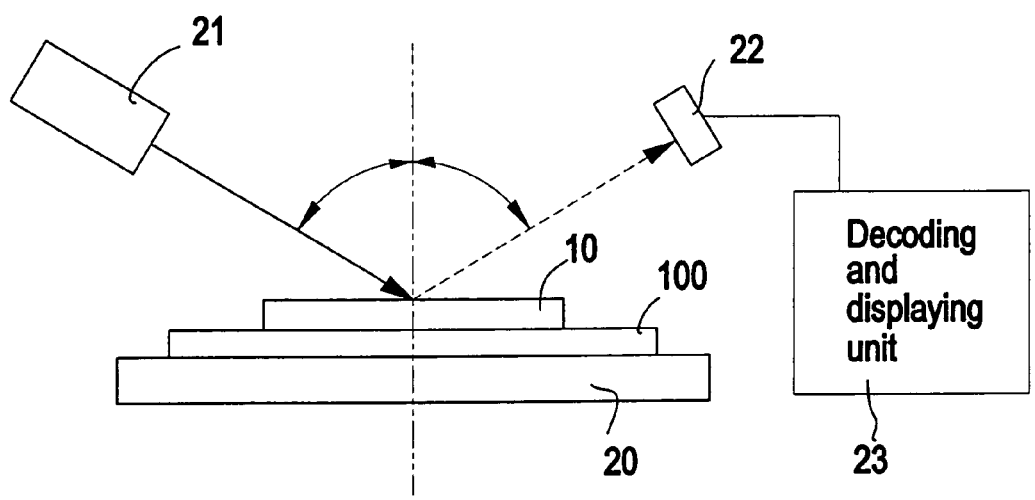
FIG. 3 is a schematic view showing an anti-counterfeit system according to one embodiment of the present invention.

With reference to FIG. 3, the system is composed of a platform (20), a light source (21), a first light detector (22) and a decoding and displaying unit (23).

The object formed with the nano metal grating (10) to be checked is placed on the platform (20). The light source provides the incident light beam to irradiate on the nano metal grating (10) along an incident angle. The first light detector (22) disposed above the platform (20) is located at the path of the reflection light from the nano metal grating (10). The decoding and displaying unit (23) is connected to the first light detector (22) to analyze the reflection light received by the first light detector (22). The inspected result of the produce is then displayed on the decoding and displaying unit (23).

For another embodiment of the inspecting system in accordance with the present invention, the platform (20) is rotatable and the first light detector (22) is able to recognize the light intensity change of the reflected light. Therefore, when the object to be inspected as well as the platform (20) are revolved, the genuineness of the object can be determined by checking whether the reflection light occurs at the particular position and whether the strength of the reflection light is varied.

Figure 4:
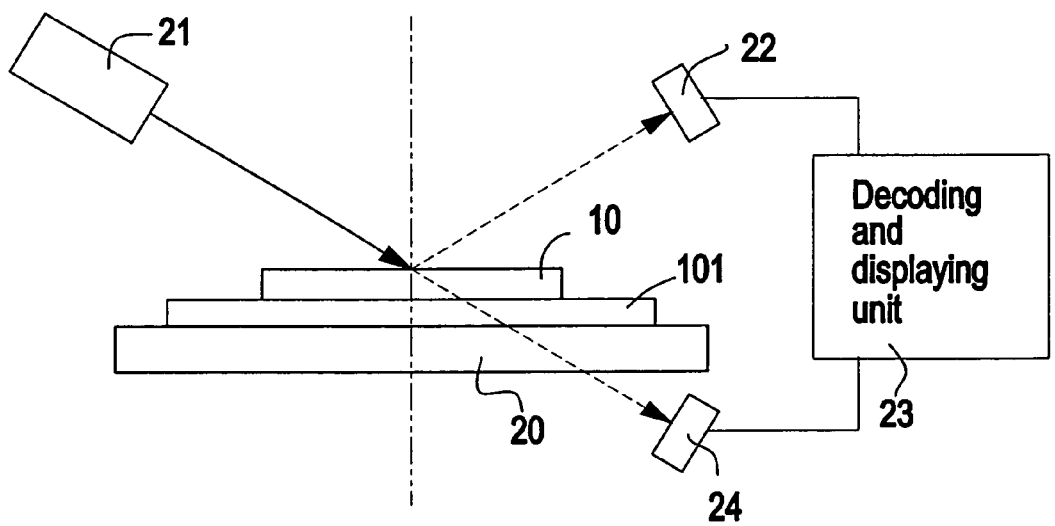
FIG. 4 is a schematic view showing an anti-counterfeit system according to another embodiment of the present invention.

With reference to FIG. 4, a third embodiment of the inspecting system is substantially the same as the previous system, wherein a second light detector (24) is placed under the substrate (20) along the refraction angle and connects to the decoding and displaying unit (23). Moreover, the platform (20) is pervious to light. The system is especially suitable when the object to be inspected is made of transparent material. Also, through checking the position of the refraction light and the reflection light, the object is able to be recognized as fake or genuine. The result is then presented by the decoding and displaying unit (23). Moreover, the platform (20) in FIG. 4 can also be rotatable and both the first and second light detectors (22)(24) are capable of recognizing the light intensity variation.

In the situation that the light source (21) can provide different wavelengths, the first light detector (22) and the second light detector are designed to receive a respective wavelength.

If the light source (21) is composed of different polarization lights, such as the P-direction and S-direction polarization lights, the first light detector (22) may be designated to receive the P-direction polarization light and the second light detector (24) is for receiving the S-direction polarization light. Alternatively, the second light detector (24) may be designated to receive the P-direction polarization light and the first light detector (22) is for receiving the S-direction polarization light.

As mentioned above, the nano metal grating is formed on an object to be inspected. When forming the nano metal grating according to the holographic technology, there are two feasible manners as discussed hereinafter.

Figure 5:
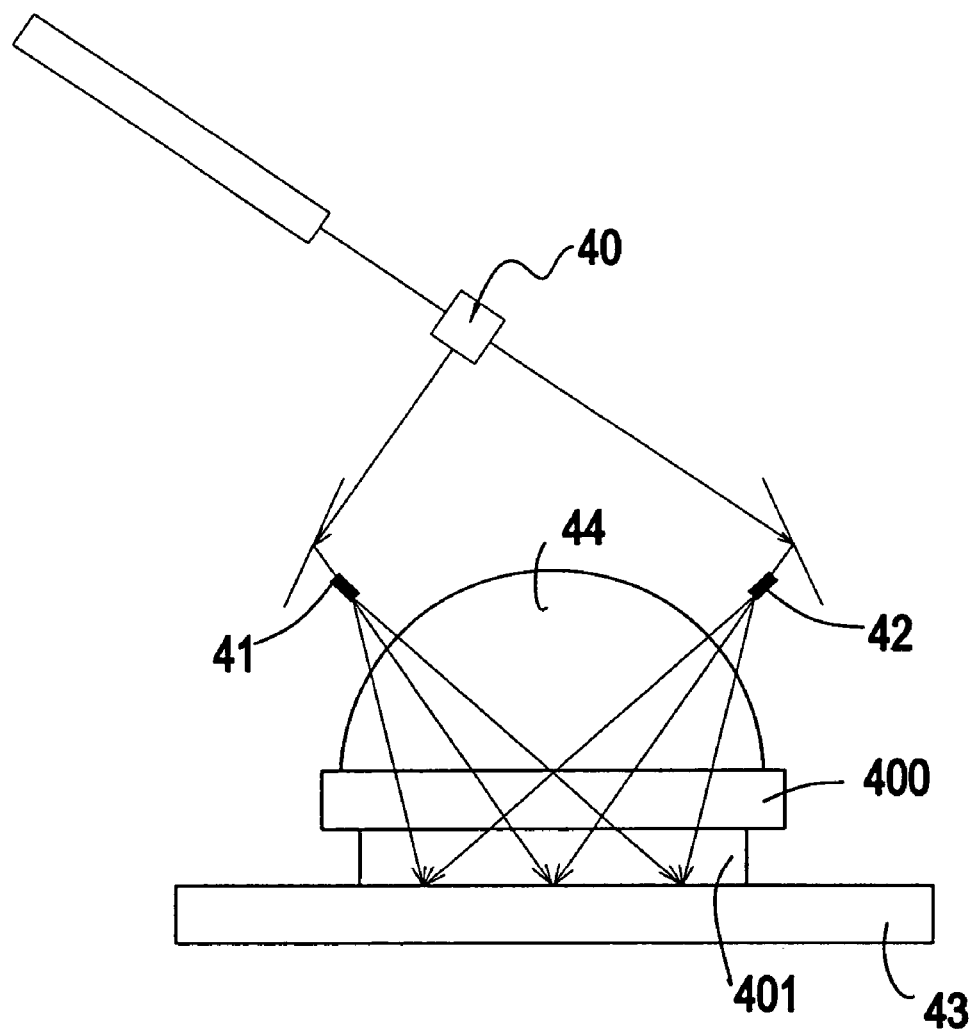
FIG. 5 is a schematic view showing the fabrication of a nano metal grating according to one embodiment of the present invention.

With reference to FIG. 5, a laser light passing through a light splitter (40) is split into two light beams. Both light beams are further respectively reflected to two lens assemblies (41, 42) each of which comprises a magnifying glass set, a pin hole and a plurality of lens. After the two light beams pass through the two lens assemblies (41, 42), each of the two light beams can turn into plural parallel, divergent or focused light beams. These light beams further irradiate on a light sensitizer layer (401) coated on a back surface of a substrate (400) through a semicircular lens (44). The light sensitizer layer (401) could be a photoresist layer. When the plural light beams from the first lens assembly (41) overlap on the light beams from the second lens assembly (42) for a pre-determined time of light exposure, an interference pattern thus forms on the light sensitizer layer (401). Since the substrate (400) is fixed on a movable platform (43), with the moving of the platform (43), multiple interference patterns are formed on the substrate to create a nano grating model. Finally, through a Lift off process, metal material can grow on the substrate (400) to form a complete nano metal grating.

Figure 6:
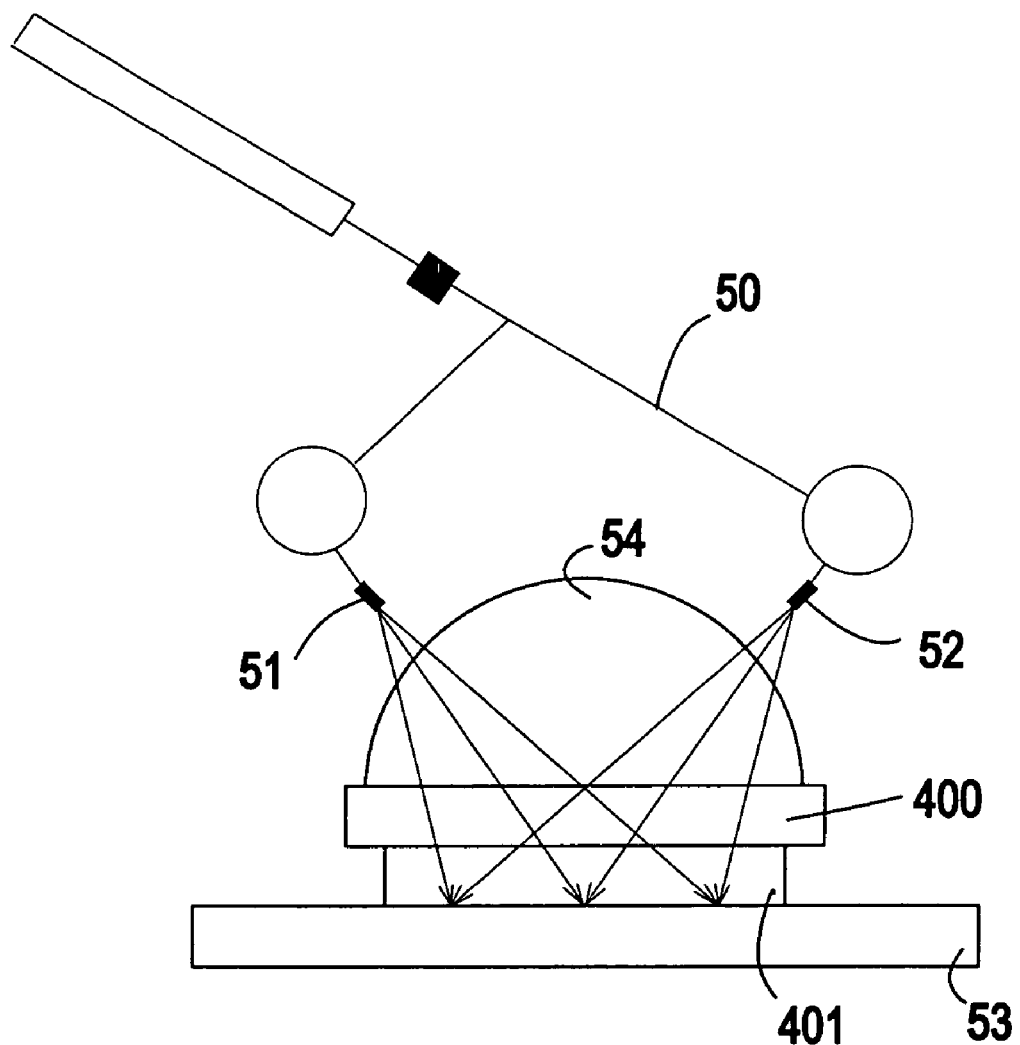
FIG. 6 is a schematic view showing the fabrication of a nano metal grating according to another embodiment of the present invention.

With reference to FIG. 6, the second embodiment to create the nano metal grating is substantially the same as previous FIG. 5. In this embodiment, the light splitter (40) is placed by a light splitting fiber (50). The laser light passing through the light splitting fiber (50) is also split into two light beams. Both light beams further respectively pass through two lens assemblies (51, 52) each of which is composed of a magnifying glass set, a pin hole and a plurality of lenses. After the two light beams pass through the two lens assemblies (51, 52), each light beam can turn into plural parallel, divergent or focused light beams. These plural light beams further irradiate on a light sensitizer layer (401) coated on a back surface of a substrate (400) through a semicircular lens (54). The light sensitizer layer (401) could be a photoresist layer. When the plural light beams from the first lens assembly (51) overlap on that the light beams from the second lens assembly (52) for a pre-determined light exposure time, an interference pattern thus forms on the light sensitizer layer (401). Since the substrate (400) is fixed on a movable platform (43), with the moving of the platform (43), multiple interference patterns are formed on the substrate to create a nano grating model. Finally, through a Lift off process, metal material can grow on the substrate (400) to form a complete nano metal grating.

The size of the nano metal grating based on the foregoing holographic technologies is approximate 20–600 nanometers. Moreover, in response to the incident light, only the reflection light and the refraction light occur on the constructed nano metal grating for the purpose of counterfeit detection.

It is noted that the manufacturing process of a nano metal grating is different to the conventional holographic process. In the ordinary holographic technology, it is difficult for the size of the grating to be smaller than a half of the wavelength of the light source. However, with the optical system of foregoing FIGS. 5 and 6, a miniature nano metal grating is easily implemented. Therefore, limited by the necessary high precision skill, counterfeiters will find it very difficult to fabricate fake goods that could not be detected with the present invention.

The present invention is not limited to the specially disclosed embodiments and variations, and modifications may be made without departing from the scope and spirit of the invention.

What is claimed is:

1. An anti-counterfeit method using a nano metal grating, comprising the acts of:
    creating a nano metal grating on an object to be inspected, wherein said nano metal grating has been polarized;
    providing incident light to irradiate the nano metal grating along an incident angle, and wherein the incident light is composed of polarization light beams of different polarization directions, whereby the polarization light beams are able to be reflected by the nano metal grating or pass through the nano metal grating; and
    inspecting whether a reflection light is only observed along a reflection angle relative to the incident angle and whether a refraction light is able to be observed from the nano metal grating, wherein if the reflection light is only observed along the reflection angle and if the refraction light is observed from the nano metal grating, the object is genuine.

2. The anti-counterfeit method as claimed in claim 1, further comprising the act of:
    inspecting whether a position where the reflection light was observed is changed when the nano metal grating is revolved.

3. The anti-counterfeit method as claimed in claim 1, further comprising the act of:
    inspecting whether positions where the reflection light and refraction light were observed are changed when the nano metal grating is revolved.

4. The anti-counterfeit method as claimed in claim 2, further comprising the act of:
    inspecting whether light intensity of the reflection light observed is changed when the nano metal grating is revolved.

5. The anti-counterfeit method as claimed in claim 3, further comprising the act of:
    inspecting whether light intensity of the reflection light and the refraction light observed are changed when the nano metal grating is revolved.

6. An anti-counterfeit system using a nano metal grating, the system comprising:
    a platform on which an object formed with a nano metal grating is placed;
    a light source that irradiates incident light on the nano metal grating along an incident angle, wherein the incident light is composed of polarization light beams of different polarization directions, and said nano metal grating has been polarized. whereby the polarization light beams are able to be reflected by the nano metal grating or pass through the nano metal grating;
    a first light detector disposed at a position to receive a reflection light from the nano metal grating; and
    a second light detector disposed at a position to receive a refraction light from the nano metal grating:
    wherein when the incident light irradiates the nano metal grating, the object is able to be recognized as genuine or fake based on whether the first and the second light detectors receive the reflection light and the refraction light, respectively.

7. The anti-counterfeit system as claimed in claim 6, wherein the system further comprises a decoding and displaying unit that connects to the first light detector to process the reflection light received by the first light detector.

8. The system as claimed in claim 6, wherein the incident light has a specific wavelength.

9. The system as claimed in claim 8, wherein the first and second light detectors are able to receive the reflection light and the refraction light having the same wavelength.

10. The system as claimed in claim 7, wherein the platform is rotatable.

11. The system as claimed in claim 10, wherein the first light detector and the second light detector as well as the decoding and displaying unit are able to detect a change of light intensity of the reflection light or the refraction light when the nano metal grating is revolved.

* * * * *